Figure 1:
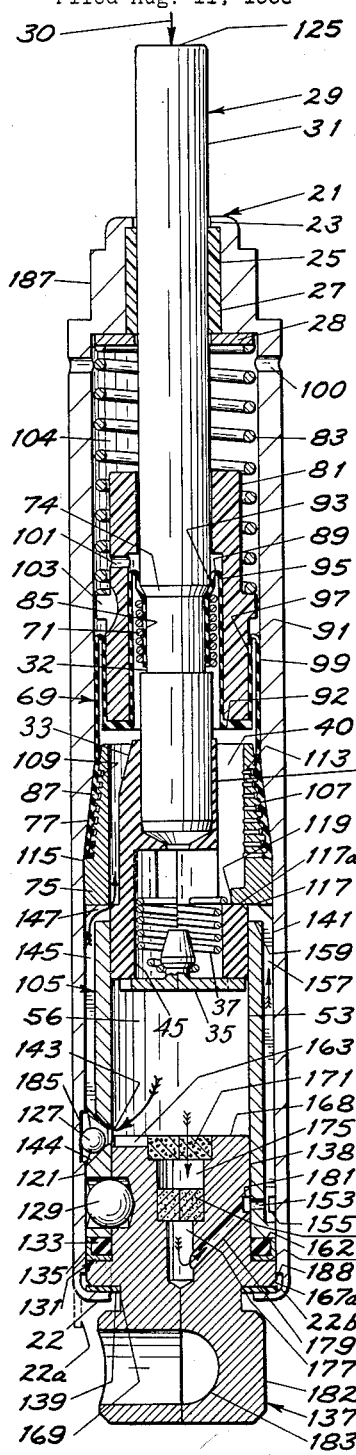

March 27, 1962   R. E. DESCHNER   3,027,152
HYDRAULIC CONTROL DEVICE

Filed Aug. 11, 1958   4 Sheets-Sheet 1

INVENTOR.
Richard E. Deschner

March 27, 1962 R. E. DESCHNER 3,027,152
HYDRAULIC CONTROL DEVICE
Filed Aug. 11, 1958 4 Sheets-Sheet 2
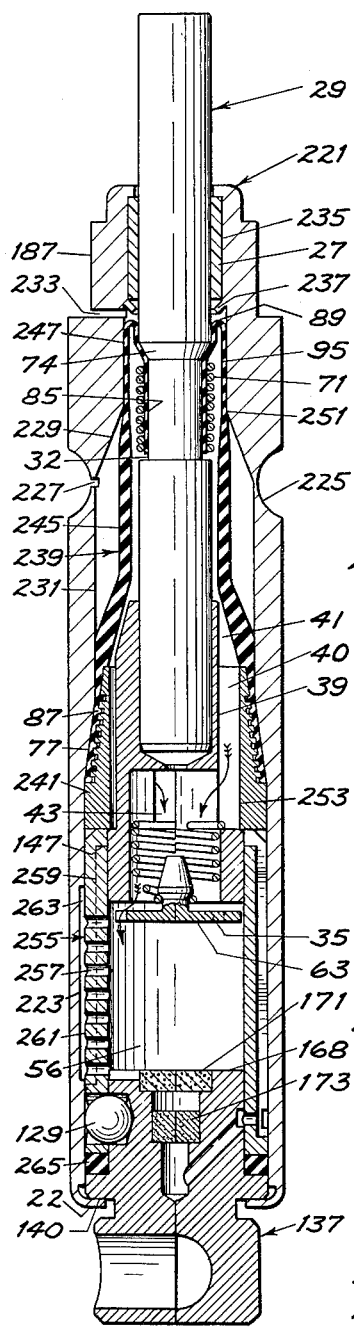
FIG. 8
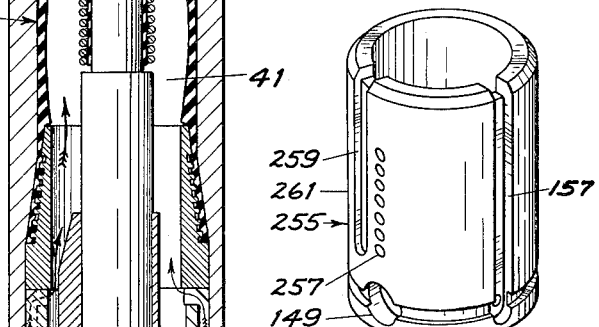
FIG. 9
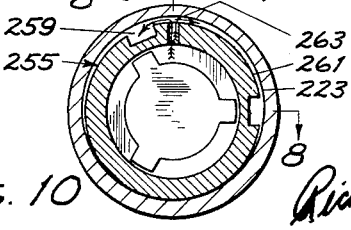
FIG. 10
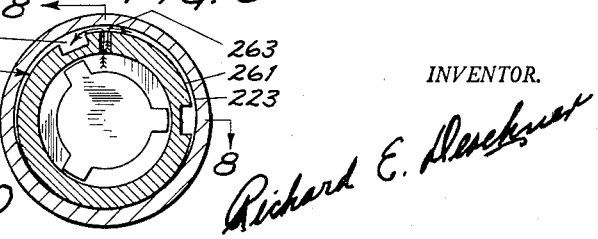
FIG. 11
FIG. 12
INVENTOR.
Richard E. Deschner

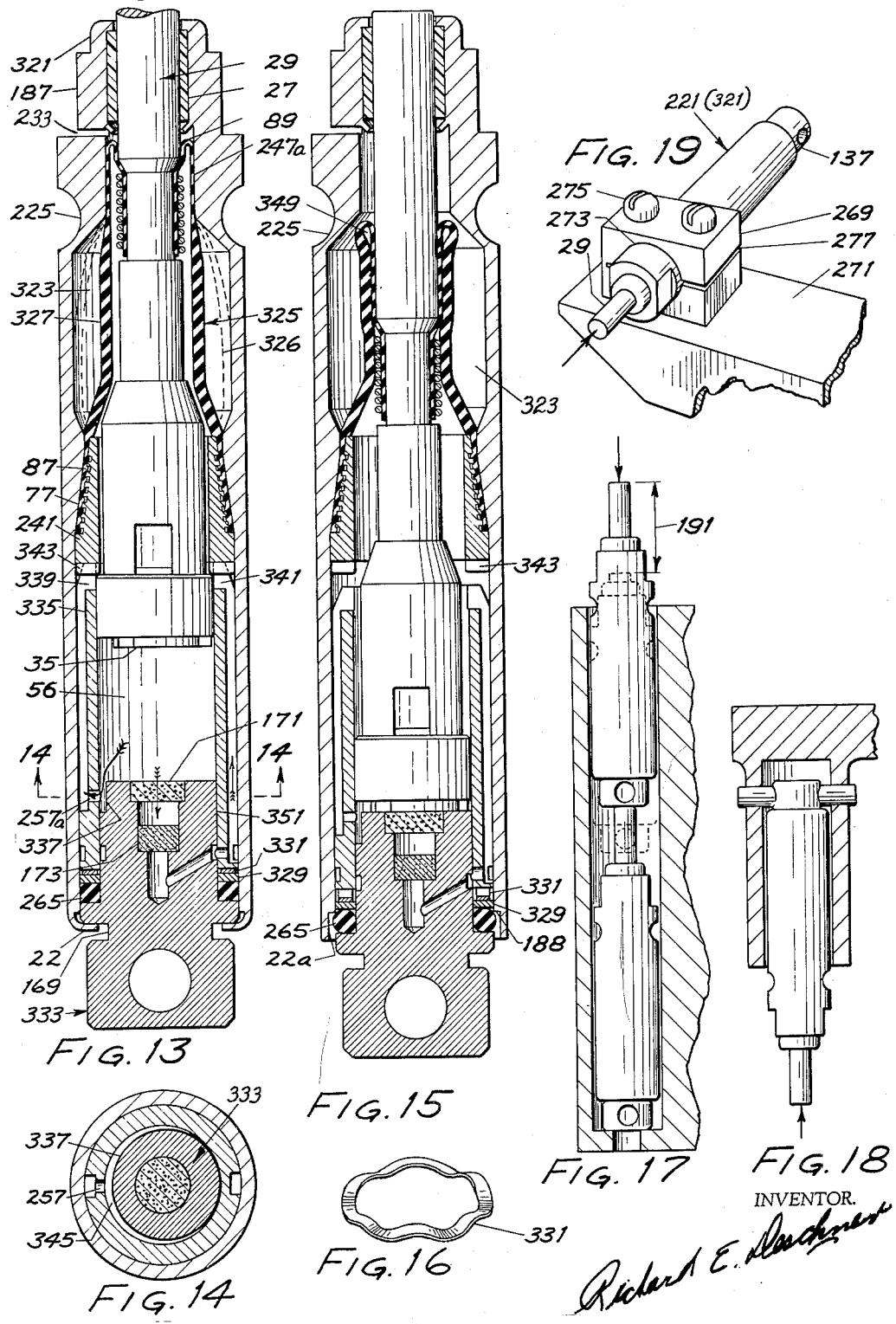

March 27, 1962  R. E. DESCHNER  3,027,152
HYDRAULIC CONTROL DEVICE

Filed Aug. 11, 1958  4 Sheets-Sheet 4

INVENTOR.
Richard E. Deschner

Patented Mar. 27, 1962

3,027,152
HYDRAULIC CONTROL DEVICE
Richard E. Deschner, 5550 Harcross Drive,
Los Angeles 43, Calif.
Filed Aug. 11, 1958, Ser. No. 754,436
28 Claims. (Cl. 267—1)

This invention relates to improvements in hydraulic control devices.

Such devices are commonly used to control the movement of mechanisms operated manually, pneumatically, by gravity, or by springs. They are used in automatic and semi-automatic machinery for controlling the speed of work feeders, drill feeders, grinder feeders, rotary indexing tables and various assembly machine components. They furnish means for absorbing impact from moving mechanical devices which must be repeatedly brought to a gentle stop, and they are seen in door closers, operation timers, shock absorbers, dash pots, vibration dampers, lost motion eliminators in control systems, etc.

Notwithstanding their usefulness, most hydraulic control units as made at present have the disadvantage of leaking oil constantly. This means they soon cover everything near them with a film of oil and they must be serviced periodically to replace oil lost. In addition, many of them have high internal friction due to the use of sliding seals, and they are expensive and often awkward to install.

An important object of this invention is to provide a complete, self contained hydraulic control unit which is permanently sealed and substantially leakproof.

Another important object of this invention is to provide a hydraulic control unit which has a long operational life during which it remains substantially leakproof so that it is suitable for use on food machinery and office machinery, and is mountable in any position for use, and may be stored for long periods of time before use without losing its charge of fluid.

A further object of this invention is to provide a universally applicable packaged hydraulic control unit which operates with a minimum of friction and which is adjustable so it may be manufactured in a relatively few standard sizes and types to control a wide range of loads at various speeds and under a wide range of conditions.

Still another object of this invention is to provide a dependable, light weight hydraulic control unit which has a small size in relation to its load capacity and stroke, and which has a simple exterior shape to facilitate its installation.

Yet another object of this invention is to provide a hydraulic control unit which is composed of inexpensive parts and which is simple to assemble so that the cost of the unit is low enough to make it advantageous to replace rather than repair it in the event it wears out.

The present invention may be constructed as a hydraulic speed checking unit for limiting the speed of moving loads to a steady rate, or as an impact absorber for stopping high speed loads quickly but gently.

Other objects and advantages of the invention will be apparent during the course of the following description.

Figures 2, 3:
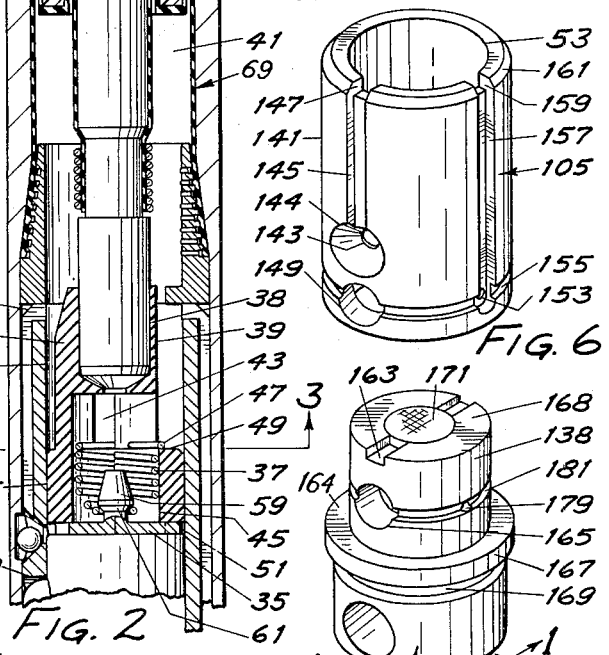
Figure 4:
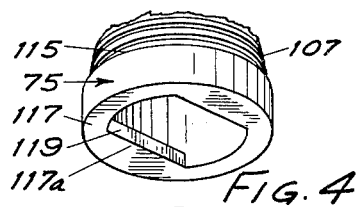
Figure 5:
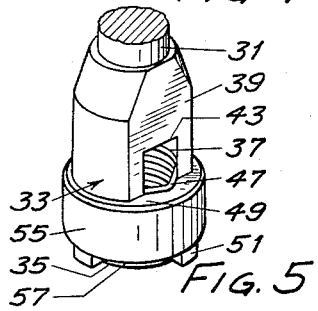
Figure 6:
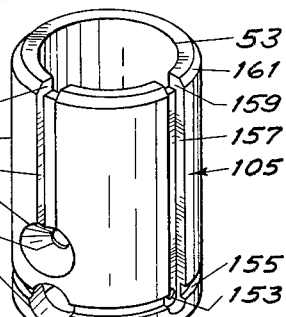
Figure 7:
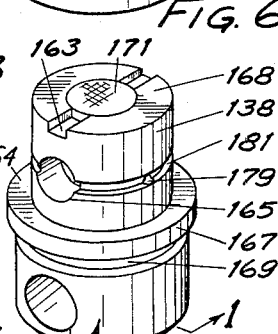
Figure 20:
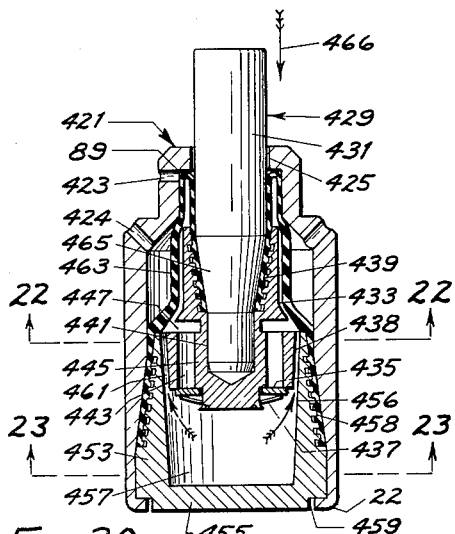
Figure 21:
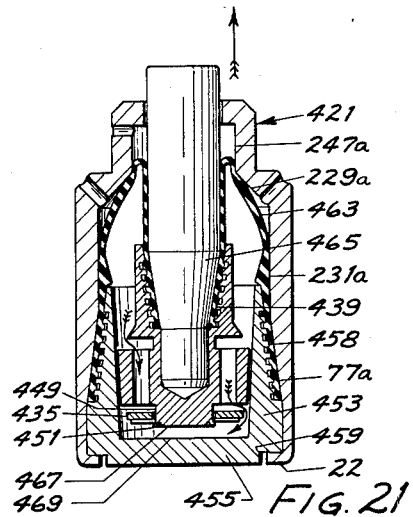
Figure 22:
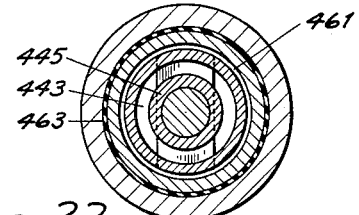
Figure 24:
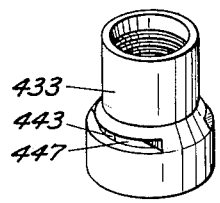
Figure 23:
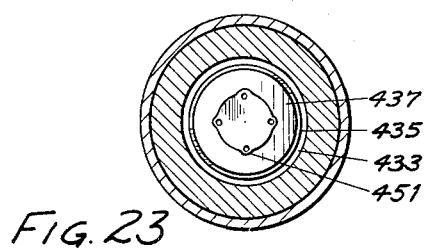
Figure 25:
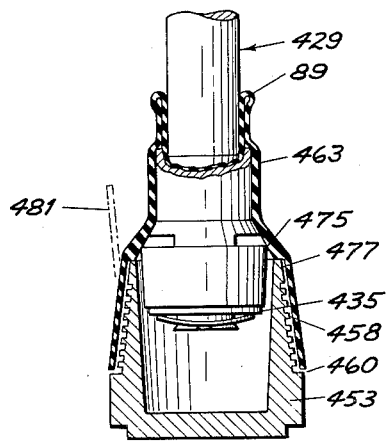
Figure 26:
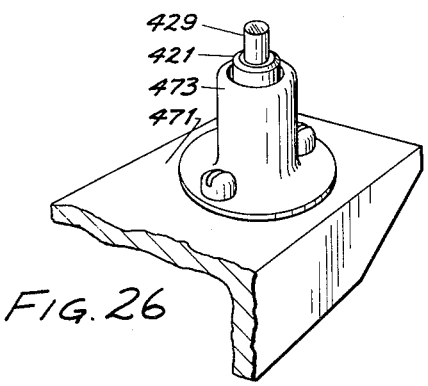

In the accompanying drawings, forming a part of this specification, wherein are shown preferred and alternate species of my invention as now reduced to practice, and in which like numerals are employed to designate like parts throughout the same, FIG. 1 is a substantially mid-sectional view taken on zig-zag line 1—1 of FIGS. 3 and 7 looking in the direction of the arrows showing the preferred embodiment of the hydraulic control unit embodying this invention, the slidable plunger being shown in its normally extended position, just at the start of a working stroke, FIG. 2 is a fragmentary view similar to FIG. 1, the plunger being shown in a retracted position at the end of its working stroke and the flexible diaphragm member expanded, FIG. 3 is a transverse section on line 3—3 of FIG. 2, FIG. 4 is a fragmentary perspective view of one end of the retainer member, FIG. 5 is a perspective view of the piston member showing portions of the piston rod and valve and valve spring, FIG. 6 is a perspective view per se of the cylinder member shown in FIG. 1, FIG. 7 is a perspective view per se of the adjustment plug member, FIG. 8 is a substantially mid-sectional view on zig-zag line 8—8 of FIG. 10 looking in the direction of the arrows showing a second species of hydraulic control unit embodying this invention, the slidable plunger being shown just having reached its extended position with its valve still open, FIG. 9 is a fragmentary view similar to FIG. 8, the plunger being shown just reaching the end of its working stroke and the flexible diaphragm member expanded, FIG. 10 is a transverse section on line 10—10 of FIG. 9, FIG. 11 is an external, fragmentary perspective view of the upper end of the device, FIG. 12 is a perspective view of the cylinder member per se shown in FIG. 8, FIG. 13 is a substantially mid-sectional view of a third species of hydraulic control unit embodying this invention, the plunger being fragmentarily shown in its normally extended position, FIG. 14 is a trasverse section on line 14—14 of FIG. 13, FIG. 15 is a view similar to FIG. 13 showing the component parts in the relative positions they occupy during one stage of the assembly, FIG. 16 is a perspective view of the wave spring washer per se used in the device, FIG. 17 is a fragmentary sectional view of a mounting installation showing two units of the invention mounted in tandem, some parts being shown in elevation, FIG. 18 is a fragmentary sectional view of a mounting installation showing a unit of the invention mounted in pendant fashion, FIG. 19 is a fragmentary perspective view of a mounting installation showing a unit of the invention horizontally mounted in a supporting bracket, FIG. 20 is a substantially mid-sectional view of a fourth species of hydraulic control unit embodying certain features of this invention, the plunger being shown in its normally extended position at the beginning of a working stroke, FIG. 21 is a view similar to FIG. 20, the plunger being shown at the beginning of its return stroke and the flexible diaphragm member expanded, FIG. 22 is a transverse section on line 22—22 of FIG. 20, FIG. 23 is a transverse section on line 23—23 of FIG. 20, FIG. 24 is a perspective of the piston member per se, FIG. 25 is a fragmentary partially cut away mid-sectional view showing the component parts, shown in FIGS. 20 and 21, as they appear during a stage of the assembly, and FIG. 26 is a fragmentary perspective view of a mounting installation showing a unit of the invention vertically mounted in a supporting bracket.

The drawings illustrate the different species of the invention which comprise a housing containing fluid and a reciprocative plunger, a portion of the plunger being accessible outside of the housing for contacting external mechanisms and controlling the movement thereof. A new type of substantially leakproof seal structure is provided to retain the fluid between the housing and plunger and to permit substantially friction-free reciprocation of the plunger, and to compensate for the fluid displaced thereby. Due to its multiple function, this new structure will hereinafter be called the "reservoir-seal structure" because no term used previously has the requisite scope or meaning, to applicant's knowledge. The flexible element in the said structure will be called the "diaphragm member," since that term is ordinarily used to designate seal elements having a membranous character, and the curved, rolling fold which connects adjacent invaginated walls of the diaphragm member will be called "convolution" since that term has been used in trade journals describing ordinary diaphragms. By the term "eccentric surface" is meant a preferably non-circular surface disposed eccentrically within the housing of the invention for speed adjustment purposes, the said eccentric surface being used either to impart movement to another element or to vary the proximity of an adjacent surface containing a flow aperture. In describing the movement of the plunger, the expression "enters the enclosure" is intended to mean "enters farther into the enclosure" since the plunger is always partly within the enclosure.

First Species

FIGS. 1-7 illustrate the preferred embodiment of the invention as it is constructed to control the speed of a moving body at a steady rate, the particular configuration shown having the characteristic of giving exceptionally long life to the diaphragm member. This is an advantage when use of the unit at extreme temperatures or with certain chemical substances dictate that the said diaphragm member must be made of material which has low strength, low flex life, or poor permanent set qualities.

Housing

In FIGS. 1 and 2, numeral 21 indicates a preferably elongated tubular housing member which is made of material preferably ductile enough to permit deformation by swaging or press forming at end 22 to retain all other components of the invention therewithin. It is provided with an internal shape which allows all internal machine work to be done from one end, and allows all other component parts of the invention to be assembled therewithin from one end. The shape of the housing end before deformation is shown at 22a. Said housing member is provided with a short bore 23, and an adjacent bore 25 enclosing a bushing 27 which is held in place by a washer 28, said bushing being made of nylon or some equivalent material that requires no lubrication.

Plunger

Slidably mounted in bushing 27 is plunger 29 which comprises a preferably hardened piston rod member 31, piston member 33, valve member 35, and valve spring 37. The said plunger 29 is a novel feature of the present invention and gives it several advantages. First, it is of simple construction, being made up of a minimum number of component parts which themselves are simple in shape and inexpensive to manufacture and assemble. Second, the said plunger is strong and rigid enough to withstand heavy end loads and is designed so alignment of piston and piston rod is automatically preserved during assembly. Third, the passageway provided for return flow of fluid through the said piston member has unusually large cross sectional area at all points to permit a rapid plunger return stroke.

Concerning particularities of the said plunger, piston rod member 31 is a simple shape having the same diameter at both ends with only a single reduced diameter portion 32. Piston member 33 is made of somewhat ductile material and is provided with an undersize bore 38 (FIG. 2) to receive piston rod 31 with a press fit. Flat surfaces 39 provide thin wall portions at opposite sides of bore 38 as shown in FIG. 5 so that stretching of the material of said piston will take place in these two thin localized areas during the press fitting operation, the remainder of bore 38 keeping its shape and guiding said piston rod to a final seated position in accurate axial alignment with said piston member. Flat surfaces 39 further provide increased cross-sectional area of the fluid flow passage at 40, as well as two large, diametrically opposite fluid return ports 43 where they intersect with the piston member bore 45, and finally, means whereby the said plunger may be slidably keyed to prevent its rotation, as will be explained later. Ports 43 find use not only for fluid return flow, but also for allowing two radially expanded portions 47 on the top coil of the valve tension spring 37 to extend radially outward through said ports to support the said spring. The latter arrangement is shown clearly in FIGS. 3 and 5. Spring 37 fits closely within piston member bore 45 to minimize its resistance to fluid return flow. It spirals inward at its lower end to a centralized bottom coil which snaps onto the stem of valve member 35 to act as valve retainer as well as valve spring. Valve member 35 is constructed as large in diameter as possible so that very low fluid pressure can open it. It is provided with peripheral extensions 51 which serve to keep it aligned with the slidable portion 55 of piston member 33 when both are engaged within bore 53 to form pressure chamber 56. The said valve member 35 seats against the bottom face 57 of the piston member and its stem is provided with one tapered portion 59 to facilitate the snap-on assembly of spring 37, and another tapered portion 61 to align the pull of said spring 37 with the center of said valve. The lower face of the valve member acts as a stop surface for the plunger at the end of its working stroke as shown in FIG. 2.

Reservoir-Seal Structure and Reserve Pressure

The reservoir-seal structure which is provided between the housing and plunger to retain the fluid, creates a variable volume reservoir and permits low friction reciprocation of the plunger. The structure comprises double action diaphragm member 69, elastic clamp member 71, a reduced diameter portion 32 and tapered shoulder portion 74 on the piston rod 31, a retainer member 75, tapered wall surface 77 in housing 21, an axially movable diaphragm support member 81 which holds the said diaphragm member in shape, and a spring member 83 which exerts force against support member 81.

Diaphragm member 69 forms yieldable boundaries for the reservoir, and in combination with the other parts of the device which retain the fluid, forms a variable volume enclosure which contains the fluid and part of the plunger. The diaphragm member has two separately yieldable portions and comprises first anchor portion 85 attached to the reduced portion 32 of the piston rod 31, second anchor portion 87 attached to housing 21, and inner and outer convolutions 89 and 91 which roll axially to permit movement of piston rod 31 and diaphragm support member 81. The diaphragm member 69 also has piston face portion 92 and four membranous invaginable walls, the innermost one 93 being held in shape by the piston rod, the next two, 95 and 97, by the diaphragm support member 81, and the last, 99, by the housing 21.

The diaphragm support member 81 is preferable made of nylon or equivalent material that needs no lubrication. It is slidably supported by the bore of the housing and the piston rod and is held by spring 83 against the diaphragm member 69. It supports said piston face portion 92 yieldably against the fluid, thereby permitting one portion of said enclosure to expand to compensate for the contraction of another portion of the enclosure as the plunger travels farther within convolution 89. It also permits the enclosure to expand and contract to accommodate changes in fluid volume due to temperature variations. Vents are provided in the housing at 100 and in the diaphragm support member at 101 and 103 so there will be no entrapped air to inhibit the double action of the diaphragm member.

Spring 83 is preferably designed to provide continuous pressure of piston face 92 against the fluid through the medium of the diaphragm support member 81 to maintain in said fluid what may be known as a "reserve pressure." The same reserve pressure will then exist in all fluid within the enclosure except that portion which may be undergoing additional pressurization by the plunger during a working stroke. The spring 83 is compressed and accumulates potential energy during a working stroke of the plunger, and since the value of the reserve pressure depends on the force exerted by spring 83, said value fluctuates somewhat as the said spring expands and contracts with movements of the reservoir-seal structure. The reserve pressure holds the diaphragm member snugly against its supporting surfaces to prevent the flexible material from wrinkling and to insure smooth rolling action of convolutions 89 and 91. In addition, the reserve pressure is useful in exerting a force which tends to expel the piston rod from the confines of the diaphragm member. This force, because of the almost frictionless rolling action of convolutions 89 and 91, and the large area of valve 35, may be used for returning the plunger after a working stroke and eliminates the need for a separate plunger return spring as would otherwise be required. The resulting advantage in saving of space is evident.

Spring 83 and support member 81 may be omitted if the device is constructed for very short stroke operation and if actuation means for the plunger is arranged to move the plunger through its return stroke as well as through its working stroke. Under these circumstances the piston face portion 92 of the diaphragm is returned by ambient air pressure during a return stroke of the plunger.

The reservoir-seal structure aids in providing another advantage for the invention by widening the range of usefulness of the device over that of a hydraulic control having sliding seals. This advantage is made possible by the low friction rolling action of the diaphragm member which allows the reserve pressure to be set at such a low maximum figure that the minimum load required to depress the plunger, and therefore to operate the unit, may be less than 3% of the unit's maximum load capacity. To give an example, in the case of a unit of the invention having a piston rod 3/16 inch in diameter, and a maximum load capacity of 200 lbs., the reserve pressure may, if desired, be set to have a maximum value below 15 p.s.i. to give a useful load range for the unit of 200 lbs. to 5 lbs.

Diaphragm member 69 must have thin walls to minimize rolling friction and to aid in keeping wall 95 to a small diameter as will be explained later. In addition, the said diaphragm member must be impervious to fluid and it must withstand a great deal of flexing and be economical to manufacture. It has been found that these requirements can be met by molding the same of a soft, flexible, homogeneous material such as 40 shore rubber without use of any fabric reenforcement. However, use of unreenforced material introduces an unusual anchoring problem when it must be anchored to metal surfaces to retain fluid pressure. The problem is, that only a portion of the said material can be clamped for sealing at the anchor because there must be an opening left in the clamping means where the unclamped portion of the material is attached, the result being that when the material is compressed by any ordinary clamping means, it extrudes out from between the clamping surfaces in an unpredictable manner and does not make a dependable seal. Such extrusion is of course augmented if the flexible material is wet with fluid as it usually is during assembly.

To allow use of unreenforced material as aforementioned, and to anchor the same within a minimum amount of radial space to keep the invention small in relation to its load capacity and stroke, two new improved types of anchor structures are provided for the said diaphragm member. They differ for reasons to be seen, but both clamp the material with a series of lateral displacements to prevent unwanted extrusion and form a sequence of compression areas of contact between the material and the confining metal surfaces.

*First Anchor Structure for Diaphragm Member*

The compactness of the first diaphragm anchor structure on the plunger, aids in keeping the whole invention to a small size relative to its load capacity and stroke, because it permits seal wall 95 to be made small in diameter. When piston rod 31 and diaphragm 69 move from their rest positions shown in FIG. 1 to their full stroke positions shown in FIG. 2, the said diaphragm expands into cavity 104 to compensate for the volume displaced by the entering piston rod. The displacement of piston rod 31 as it travels within the confines of diaphragm member 69, depends on the cross sectional area enclosed by the mid-circumference of convolution 89 and since the said displacement determines the size required for cavity 104, it follows that keeping diaphragm wall 95 to a small diameter helps to reduce the overall size of the invention relative to its load capacity and stroke. Diaphragm wall 95 is permitted to be small in diameter while adequate clearance for movement of plunger member 29 therethrough is assured, by the particular configuration of the first anchor structure which comprises piston rod diameter 32, shoulder 74, first diaphragm anchor portion 85, and elastic clamp member 71.

The said elastic clamp is originally wound to have a free diameter smaller than that which it must assume after assembly. It is installed by being expanded and released over the first anchor portion 85 where it then exerts a 360° clamping action. The undulating surface of the inside diameter of said elastic clamp inhibits axial extrusion of the flexible material by causing it to undergo a series of lateral displacements to form the aforementioned sequence of compression areas of contact between the material and piston rod 31. The said elastic clamp thereby produces a long life, substantially leakproof seal, compensating for shrinkage or permanent set which may take place in the flexible material with age. It will be evident that the said elastic clamp occupies a minimum of radial space, allowing diaphragm wall 95 to be small in diameter without requiring diameter 32 to be so small that piston rod 31 is weakened excessively, and it will be noted that the terminal edge of first anchor portion 85 is turned toward the fluid so pressure in the fluid intensifies the clamping action of elastic clamp 71.

The diaphragm member 69, being unreenforced and thin-walled is easily ruptured if not properly installed, and piston rod shoulder 74 is tapered to provide not only locating means but also stress minimizing retaining means for the said diaphragm member. Before assembly of elastic clamp 71, said shoulder is used to position the first diaphragm anchor portion 85. After assembly of said elastic clamp, the shoulder 74 in combination with said elastic clamp, prevents axial movement of the said anchor portion 85. The tendency for axial movement of said anchor is induced unintentionally during assembly when the diaphragm member is pulled back and forth while being installed. After assembly, the same tendency is induced by impact of loads striking the plunger and by fluid pressure creating axial pull on the diaphragm wall 93. The said pull is partly taken by shoulder 74 and partly transmitted past shoulder 74 where it expands the end coils of the said elastic clamp slightly, either axially or radially or both, and produces a controlled stretching of the diaphragm anchor 85 which in turn produces a gradient tension in the same and precludes the tendency for the material to tear.

Second Anchor Structure for Diaphragm Member

For the second diaphragm anchor structure in the housing, an elastic clamp may be used to compress the anchor portion of the diaphragm against the housing the same as it is on the plunger, the only difference being that the clamp must be compressed rather than expanded to be installed. However, the operation of assembling the first diaphragm anchor structure on the piston rod takes place before the piston rod is installed in the device and is not difficult, whereas installation of the second diaphragm anchor structure within the housing member is a quite different procedure, being attended by the requirement that the installation be made deep inside the narrow bore of the said housing member. For this and other reasons to be seen, a different configuration is provided for the second diaphragm anchor structure, and it not only simplifies the assembly procedure but also provides in a space of small radial extent, stop means for the plunger member 29, thrust bearing means for the rotatable cylinder member 105, and means for preventing rotation of the sealing surfaces when torque is received from the said cylinder member 105.

The second diaphragm anchor structure comprises tapered wall surface 77, second diaphragm anchor portion 87, and retainer member 75 which is shown in FIGS. 1 and 4 to be provided with tapered surface 107, grooves 109, relief ports 113, lateral shoulder 115, thrust bearing surface 117, plunger stop surfaces 117a, and chordal surfaces 119.

At time of assembly a suitable assembly tool may be used to hold the diaphragm member 69 along with plunger 29, diaphragm support 81, spring 83, and retainer 75, all in approximately the same relative positions they occupy in FIG. 1 and to install the whole by axial movement into housing 21, the retainer member being forced in until shoulder 115 locks in place within the tapered surface 77. As the said retainer is moving into place, the flexible material of second anchor portion 87 is forced by shoulder 115 to slide within taper 77 and to be compressed a pre-determined amount thereby, grooves 109 contributing an anti-skid surface and space for radial extrusion of the flexible material. The metal to metal joint formed by the locking together of shoulder 115 and taper 77 may or may not be leakproof in itself.

It will be apparent how the aforementioned sequence of compression areas is formed between the flexible material and the tapered surfaces 77 and 107 without allowing the said material to be misplaced in an axial direction. The leakproof life of this improved anchor structure is enhanced by the multiplicity of sealing areas, a gradual relaxation of the resilience in the elastic material with age being of negligible consequence because of the number of individual sealing areas which combine to prevent leakage.

The installation of working fluid without the inclusion of air bubbles, is facilitated on small sizes of the invention if the deep interstices of the diaphragm member 69 are filled with fluid before the said diaphragm member is inserted into the housing. However, this procedure often results in unintentional wetting of grooves 109, and since the said grooves are narrow, they quickly fill and retain fluid by capillary action. If the said grooves are brim-full of fluid during assembly of the diaphragm member into the housing 21, the function of the said grooves to permit radial displacement of the flexible material as heretofore described is inhibited, with consequent axial slippage and misalignment of the second diaphragm anchor portion 87. To preclude this possibility, relief ports 113 are provided to bleed off liquid trapped in the said grooves during installation. It will be apparent that after the device is in operation, ports 113 act to pressurize all grooves with the aforementioned reserve pressure, thereby helping to insure leakproofness of the seal. When relief ports 113 are not provided and said grooves are kept dry, air is compressed in the said grooves at assembly. This increases the compression in the flexible material somewhat and may be used to lengthen the useful life of a diaphragm anchor made with flexible material having poor permanent set properties.

For large quantity production it may be found advantageous to make retainer member 75 from sintered powdered metal, omitting the relief ports. Then the advantages of relief ports 113 described, are automatically obtained because the fluid can flow through the walls of the retainer.

Non-Rotating Means and Stop Means for Plunger

It will be apparent from FIG. 1 that since diaphragm member 69 is fastened to plunger 29 and also to housing 21, the said diaphragm would be damaged if unlimited rotation of said plunger relative to said housing took place. FIGS. 4 and 5 show that to prevent incidental rotation, retainer member 75 is provided with chordal surfaces 119 to engage with aforementioned flat surfaces 39 provided on piston 33. The said surfaces engage loosely to allow some relative motion between plunger and housing to facilitate assembly of the device, and to prevent excessive wear on the end of the plunger at 125 when the device is being actuated by a load which tends to rotate the plunger slightly as it advances. The surface 117a of retainer member 75 acts as a stop for plunger member 29 on its return stroke.

Cylinder, Plug Member, and Plug Seal

As may be seen from FIGS. 1, 6, and 7, retainer member 75 is secured in position by a succession of parts beginning with rotatable cylinder member 105 and continuing with valve ball 127, key ball 129, plug seal assembly 131 which comprises resilient seal member 133 and ring 135, rotatable adjustment plug member 137, thrust washer 139 which is split radially for assembly purposes, and finally the deformed end 22 of the housing which neatly retains all components within the device in tamper-proof fashion.

Valve ball 127 provides an obstruction to the flow of fluid with a short enough length of restriction so the flow speed will vary a minimum amount with changes in temperature and viscosity of the fluid. Cylinder member 105 is provided with an outer diameter 141 which fits snugly but not leak-tight within housing 21, a slidably fitting bore 53 for piston member 33, a fluid escape aperture 143, valve seat 144, primary escape groove 145, primary connecting notch 147, and pressure chamber 56 whereby the working fluid may be compressed and allowed to escape at a controlled rate to check the speed of movement of plunger member 29. The cylinder member is also provided with a keyhole 149 to receive key ball 129, a port 153 (FIG. 1) for fluid flow, a circumferential pressure relief groove 155, a secondary escape groove 157, secondary notch 159, chamfer 161, and lateral shoulder 162.

Plug seal assembly 131 is compressed between lateral shoulder 162 on the cylinder member and lateral shoulder 164 on the plug member 137 to provide a fluid seal for the device and to exert axial pressure on the cylinder member to secure the cylinder member and retainer member in place. The said seal assembly permits plug member 137 to rotate cylinder member 105 by means of key ball 129 yet provides friction to prevent the said plug member from accidentally rotating by itself and changing adjustment. Ring 135 of the seal is made of nylon or other resilient low friction material. It increases the wear life of the plug seal and prevents the same from adhering to all of its confining surfaces in case the working fluid is of such a nature as to promote adhesion of seal 133 to metal. Thrust ring 139 may be made of graphite impregnated bronze or some equivalent hard material with a low coefficient of friction and may be used to advantage on larger sizes of units to reduce friction at the adjustment plug member, or it may be made of nylon or other resilient material to form a secondary fluid seal as well as a friction reducing means.

Rotatable adjustment plug member 137 is preferably made of hardened steel. It is provided with a cylindrical upper end portion 138 having a diameter which fits snugly but not leak-tight within cylinder bore 53, a flow notch 163 to clear aperture 143, keyhole 165 to receive key ball 129, aforementioned lateral shoulder 164, flange portion 167, groove 169, two filter elements 171 and 173, trap space 175, filter flow passageways 177 and 179, circumferential relief groove 181, external boss portion 182 which preferably is made as large as it can be without interfering with tools which may be required to form end 22 of the housing, and external radial hole 183 which may be used as a wrenching means to rotate the said plug member or as an anchor or bearing hole to mount the whole unit. For practical purposes hole 183 may be made just large enough to receive a rod the same diameter as the piston rod.

*Operation and Adjustment*

The embodiment illustrated in FIG. 1 shows the invention provided with one escape aperture, namely 143, to form a device for controlling the speed of a moving load at a steady rate. The plunger is shown in its extended position just at the start of a working stroke. When an external load is applied to the end 125 of plunger member 29 as shown by the arrow 30, said plunger moves inward and the fluid within pressure chamber 56 is pressurized sufficiently to create a reaction force equal and opposite to said load. Simultaneously fluid flows as shown by the heavy arrows, escaping at a steady rate through aperture 143 and controlling the speed of the said load at a steady rate accordingly. The escaping fluid is forced against the reserve pressure and through the passageway formed by groove 145 and notch 147 into the reservoir space 41. As the plunger moves through its working stroke, piston rod 31 moves inwardly displacing fluid within the reservoir space 41 and causing the piston face 92 of the reservoir-seal structure to rise against the action of spring 83 until it finally reaches the position shown in FIG. 2.

When the said external load is removed at 30, the reserve pressure within the device expels the plunger and causes fluid to flow quickly from the reservoir space 41 through the passageway in the plunger formed by ports 43, bore 45, and valve 35, and thence to the pressure chamber to make ready for a new working stroke. Flow arrows illustrating this latter type of action as well as that for a different species of the invention, are shown in FIG. 8.

An important feature of the invention which allows any one size of unit to be used for a wide range of loads and speeds lies in the new improved means provided for adjusting the escape rate of flow of the pressurized fluid from the pressure chamber. The said adjustment means comprises, in addition to elements previously mentioned, an eccentric surface 185 provided in the housing. The said eccentric surface may be similar in shape to the eccentric surface 223 shown in section in FIG. 10.

When the device is put in service to control the speed of a moving load, adjustment to the proper plunger speed may be accomplished by using the external hole 183 as a wrenching means to rotate plug member 137 within the housing 21 against the aforementioned friction of plug seal 131, said rotation being transmitted through key ball 129 to cylinder member 105 which carries valve ball 127 circumferentially around the inside of eccentric surface 185 until a point is reached where the fluid flow through aperture 143 is restricted the proper amount.

Valve ball 127 and conical seat 144 are provided as the flow restricting means to minimize the length of the flow restriction and reduce fluid friction so flow speed will vary a minimum amount due to changes in temperature and viscosity of the fluid. These two elements may be omitted entirely from the invention and the proximity of eccentric surface 185 to the aperture used as the flow restriction if temperature considerations are not important.

Housing 21 is provided with chordal surfaces at 187 to provide wrenching means to counteract the torque transmitted to plug member 137 during adjustment. FIG. 11 is of a different species, but shows approximately how the said chordal surfaces would appear in perspective. Key ball 129 provides an inexpensive keying means and an advantage because it can be installed radially through keyhole 149 at time of assembly.

*Filter System*

As a means of preventing gradual clogging of the flow aperture at the valve ball 127 and as a means of prolonging the wearing life of the device, a by-pass filter system is provided within the plug member 137, as shown in FIG. 1, to remove from the working fluid any foreign material that might be unintentionally included at time of assembly or accumulated later from wear of the parts. The said filter system preferably comprises a 50 to 150 micron coarse element 171 and a 2 to 5 micron fine element 173, both of which are preferably of the sintered metal powder type. Also the trap space 175 and flow passages 177 and 179 form a part of the aforementioned filter system.

As plunger 29 moves through its working stroke, most of the pressurized fluid flows as shown by the heavy arrows in FIG. 1 through aperture 143, up groove 145, and through notch 147 to the reservoir space 41. Simultaneously, a small percentage of the said pressurized fluid flows as shown by the light arrows through filter element 171 depositing any harmful foreign material in trap space 175 before it passes out through element 173 and passages 177 and 179 and thence to the reservoir space 41 through port 153 and the secondary escape groove 157. Filter element 171 is coarse enough to pass foreign material carried through by the fluid, but prevents foreign material from dropping out of trap space 175 when the device is being used in an inverted position.

Filter element 173 is made fine enough to restrict the flow through the filter system. Of course the rate of flow cannot be set exactly, and it will vary greatly depending on the fluid pressure within pressure chamber 56. However, as a means of arriving at some sort of aiming range in which the flow might be set for various sizes of units, a satisfactory flow rate may be assumed to be that which will allow the plunger to travel a complete working stroke in from 3 to 12 seconds when a pressure of 2000 p.s.i. exists within the pressure chamber and the speed adjustment is closed as tightly as possible.

During the operational life of the device, all portions of the fluid pass periodically through the said filter system keeping the said fluid clean and prolonging the wearing life of the device.

*Pressure Relief System*

In hydraulics, when flexible seals such as O ring seals are used to retain fluid pressures over 500 p.s.i., a slight movement or "working" of the seals takes place at each large pressure variation. This usually happens even if the said seals are compressed between stationary surfaces, and results in a minute amount of fluid leakage at each movement.

In the present invention, compression of the resilient plug seal 133 is relied upon not only to prevent leakage but also to maintain friction on flange 167 of the adjustment plug member to prevent it from accidentally rotating and changing adjustment by itself. However, the said plug seal could not be compressed to a value high enough to insure leakproofness against the maximum fluid pressures attained within the invention without requiring such heavy axial clamping of the said adjustment plug member that it would make speed adjustment difficult.

Therefore, it is an important feature of the present invention to preclude necessity for excessive compression of plug seal 133 by providing a pressure relief system to protect the said seal from exposure to pressures substantially greater than that of the reserve pressure. To eliminate the chance of leaking as completely as possible, the second anchor 87 of the diaphragm member is similarly protected. It will be apparent from FIG. 1 that the first diaphragm anchor 85 is naturally protected from all but the reserve pressure by its location. The said relief system will be more easily understood if a further brief explanation of the operation of the invention is first made.

During a working stroke of the piston 33, when high pressure exists within pressure chamber 56, fluid not only flows out of the said pressure chamber through escape aperture 143 and filter element 171 as aforementioned, but also leaks out past piston 33, valve 35, and through the interstice at 138 between the mating walls of the plug member and cylinder member.

It will be evident that leakage past piston 33 and valve 35 passes directly into the reservoir space 41 wherein the reserve pressure exists, and that flow through aperture 143 is led to the same space by the primary escape groove 145 and connecting notch 147 which are provided for this purpose.

Due to the large cross sectional areas of groove 145 and notch 147, fluid pressure therewithin is usually substantially the same as the reserve pressure and these passageways are accordingly, considered to be a part of the fluid reservoir. However, at times when the invention is adjusted for high speed with escape aperture 143 wide open or nearly so, surges of high pressure may enter groove 145 during each stroke of piston 33. Therefore as a safeguard, second diaphragm anchor portion 87 is protected from possible high pressure leakage between retainer member 75 and housing member 21 by the chamfer 161, see FIGS. 2 and 6, provided on the cylinder member. The said chamfer increases the area in the passage conducting the said surges to the reservoir space and leads part of the flow around the cylinder member to the secondary notch 159.

Due to the low flow rate from the filter and the comparatively large cross-sectional areas of the secondary escape groove 157 and notch 159, fluid pressure therewithin is always substantially the same as the reserve pressure and these passageways are, accordingly, considered to be a part of the fluid reservoir. Protection of plug seal assembly 131 is accomplished by provision of circumferential relief groove 155 which surrounds the cylinder member as shown in FIG. 6, to conduct pressure surges which leak from ball seat 144 through the interstice at 121 between cylinder and housing, into the secondary escape groove 157 before they can reach the said seal assembly. Relief groove 155 and keyhole 149 are made to intersect as shown in FIG. 6 to save space, the function of each being unaffected by the presence of the other.

Plug seal assembly 131 is also protected from high pressure leakage through the interstice at 138 by provision of aforementioned circumferential relief groove 181 which surrounds the plug member and conducts the slight amount of leakage flow to port 153 whence it passes through the secondary escape groove 157 to the reservoir space 41. Relief groove 181 and filter passage 179 intersect so flow through both reaches port 153. Groove 181 and keyhole 165 are made to intersect as shown in FIG. 7 to save space as in the case of the similar elements of the cylinder member.

With the aforesaid protection of plug seal 131 from high pressure, the requirements of having sufficient compression of the said plug seal, and at the same time a satisfactory amount of friction at the adjustment plug member, may be met in any particular size of the invention. Use of either one or both rings 135 and 139 of FIG. 1 or, as will be explained later, rings 329 and 331 of FIG. 13, can be made to help meet these requirements.

*Retention of Plug Seal and Plug Member*

Many advantages are given to the invention by the structure which comprises the deformed end of the housing holding the plug member axially against the plug seal, with the cylinder bore and housing holding the plug member in axial alignment. For one, the combination of the deformed wall at 22 and the resilient seal member 133 may be used as a means of creating at time of assembly, enough compression in said seal member to create a substantially leakproof seal with assurance that said plug member 137 will not be locked from rotation. To accomplish this, it is first necessary that the inner radius 22b of the said deformed end be prevented from gripping the plug member flange 167, and this is assured by provision of shoulder 188 or chamfer 167a or both. Second, it is necessary to proportion the thickness of wall 22a in relation to the size and resilience of seal member 133 so there is a slight amount of return movement of deformed end 22 caused by the resilience of seal member 133 after the deforming tool is removed. This self-relieving action prevents the deformed material from locking plug member 137 from rotating, and takes place regardless of whether a barely sufficient or an excessively high pressure is used in the deforming operation. A second advantage is given to the invention by the said structure, in forming a simplified means of retaining the components within the housing while guaranteeing that the leakproofness of resilient seal 133 will not be impaired by tampering. A third advantage lies in the structure's providing a streamlined exterior shape to improve the appearance of the whole unit and permit it to be installed in a smooth bore, either singly, as shown in FIG. 18, or in tandem, as shown in FIG. 17, the latter arrangement being used to gain a greater length of stroke as indicated by numeral 191 in the latter figure. An additional advantage of the aforesaid arrangement lies in the versatility of mounting means thereby provided which permits the housing to be fastened to a support base to serve as mounting means and the plug member to be rotated for adjustment, or conversely, the plug member to serve as mounting means and the housing to be rotated for adjustment. It will be apparent that that part of the unit which serves as the mounting means, receives from its support base the reaction force which is substantially equal and opposite to the load acting against the plunger. A fifth advantage then, lies in the plug seal assembly 131 being protected from receiving mechanical reaction forces that would tend to make the seal "work" during cycling, with consequent leakage. This protection is accomplished by the configuration of parts which will be seen from FIG. 1 to transmit the said reaction forces, whether received through the housing or the adjustment plug, past plug seal 131 to plug face 168 to resist directly the force of the high liquid pressure or that of the plunger striking the plug at the end of its stroke. Finally, a sixth advantage is that the aforementioned friction at the plug member permits testing the adjustment plug torque to determine during or after assembly whether a sufficient degree of deformation has been applied to the housing to render the plug seal leakproof.

*Miscellaneous—First Species*

To keep the number of drawings in the present disclosure to a minimum, the procedure used for installation of the fluid within the present invention is illustrated only in FIG. 15 and explained under the description of the corresponding species. However, the same procedure is used for the species of FIG. 1 just described.

*Second Species*

FIGS. 8–12 show an alternate or second species of the invention which for any one certain load capacity is smaller, simpler, and less expensive to manufacture than the first species. The embodiment illustrated in the latter figures shows the invention constructed as an impact absorber but it will be understood this is for illustration purposes only, this species also being constructable to control the speed of loads at steady rates.

The diaphragm member of the second species will be seen to be subject to greater stresses than that of the first species, but nevertheless it will have a long working life if it is made of material which will withstand repeated stretching without acquiring too much permanent set. Several of the synthetic rubbers now on the market have been found suitable in this respect, but the material for longest life can only be chosen after all the working requirements for the device such as ambient temperature, chemical environment, type of working fluid, etc. are known.

The second species differs mainly from the first by the elimination of bushing retaining washer 28, diaphragm support member 81, spring 83, valve ball 127, plug seal ring 135, and thrust ring 139. In addition the chordal surfaces 119 have been omitted from the retainer member 75. Other parts which remain identical with those of the first species are: bushing 27, plunger member 29, elastic clamp 71, and adjustment plug member 137 which includes the filter elements 171 and 173.

Housing

In FIG. 8, numeral 221 indicates the housing member which again is made of ductile material and provided internally with bores stepped progressively to facilitate fabrication and assembly. The housing is again provided with external chordal surfaces 187, for reasons earlier specified, and with an internal eccentric surface 223, see also FIG. 10, for speed adjustment purposes. In addition the said housing is provided with oppositely disposed mounting notches 225, vent slot 227 which intersects with bores 229 and 231, and vent slot 233 which intersects with bore 235. FIG. 11 shows the external appearances of these features. Bushing 27 is provided as before, but in this species is held assembled by a deformed portion 237 in the housing instead of by a washer.

Reservoir-Seal Structure and Reserve Pressure

The reservoir-seal structure of the second species depends on inherent elastic properties of the diaphragm member itself rather than on a metal spring for creating the variable volume enclosure and resilient means for the reserve pressure. In the second species, the said seal structure comprises only the double action flexible diaphragm member 239, reduced diameter 32 and tapered shoulder 74 on the piston rod, retainer 241, and tapered wall surface 77 in the housing.

The diaphragm member has a diametrically expansible wall portion 245. It also has a first anchor portion 85 and a second anchor portion 87 as before, and an invaginated portion including one convolution 89 which performs the same function as in the first species by rolling axially to permit reciprocation of the piston rod. As in the first species, the diaphragm wall 95 is made thin and is held to a small diameter by housing bore 247 so that the displacement of the piston rod during its reciprocation is kept to a minimum. In this way the amount of expansion required of the enclosure is kept small and the size of the whole unit is made smaller as explained for the first species.

In FIG. 9, plunger 29 is shown just completing a working stroke and the diaphragm member 239 is shown in its expanded position. In FIG. 8 the plunger is shown just completing a return stroke and the said diaphragm member is shown in its rest position. It will be seen that vent slots 227 and 233 allow air to escape from and return to the housing so there will be no entrapped air to inhibit the double action of the diaphragm member.

The diaphragm member is molded originally with the expansible wall portion 245 smaller in diameter than it appears in FIG. 8. At time of assembly the said wall portion is expanded to the diameter of FIG. 8 by pressurization of the working fluid. From that time on, the stretched flexible material, in trying to return to its original size, exerts a force which maintains a reserve pressure throughout the fluid within the device. As in the first species, the said reserve pressure insures smooth rolling action of convolution 89 while preventing the flexible material from wrinkling, and here again the action of the diaphragm member is so nearly frictionless that the reserve pressure alone is sufficient to return the plunger after a working stroke.

The expansible wall 245 by stretching, accumulates potential energy during an inward stroke of the plunger, the amount of energy and the value of the resulting reserve pressure depending on several factors, namely: the thickness of the material at wall 245, the amount of original stretch in the material, and the modulus of elasticity of the material. By balancing these factors it is possible to set the reserve pressure low to give a wide load range, and it is possible to vary the rate at which the plunger return force increases during the plunger working stroke, just as it was possible in the case of the spring actuated diaphragm member in the first species.

Housing bores 229 and 231 form an expansion chamber for the diaphragm member. Bore 229 is made conical to form an obtuse angled corner 251 for two reasons. First, the obtuseness minimizes tension in the expanding material just outside of bore 247 to lessen the tendency for the flexible material to slide back and forth at the corner and cause wear while cycling. Second, it moderates the rate of the stress gradient in the flexible material adjacent to the said corner so that stress concentration in the material itself will not cause fatigue failure due to the oft-repeated stretching and relaxing.

Due to the greater unsupported length of the second species diaphragm member over that of the first, greater rotation of the plunger relative to the housing is possible without damage to the said diaphragm member. For this reason, no chordal surfaces are provided on retainer 241 to engage with the piston flats 39, the internal diameter 253 of the retainer being reduced in size sufficiently to furnish a stop for plunger 29 on its return stroke.

Cylinder

In FIGS. 8 and 12, numeral 255 indicates the cylinder member which instead of having one aperture with a valve seat as in the first species, is provided with a plurality of apertures 257 which do not have valve seats and which are arranged in an axial row in a spaced relation to the primary escape groove 259. All other features of the cylinder member are the same as in the first species and similarly numbered.

Operation and Adjustment

In FIG. 9, the plunger is shown just completing a working stroke and the heavy flow arrows show fluid flowing from the pressure chamber 56 through escape apertures 257 and up to reservoir space 41 through the primary escape groove 259. The light arrows indicate a small percentage of fluid flowing through the filter system simultaneously. In FIG. 8 the plunger is shown just completing a return stroke and the flow arrows show how fluid passes from the reservoir space 41 through ports 43, past valve 35, and back to within the cylinder member.

A single escape aperture as shown in FIGS. 1–2 characterizes a unit of the invention as being a device for controlling the speed of a moving load at a steady rate, while a plurality of apertures spaced axially in the cylinder member as shown in FIGS. 8–9 characterize a unit of the invention as being an impact absorbing device.

The function of an impact absorber is to decelerate a fast moving load to a stop without creation of unwanted impact. The axial row of apertures 257 accomplishes this result. The large fluid escape area which exists when the plunger is at the starting end of its stroke, allows the plunger at the instant the load strikes, to assume substantially the same high speed as the load was traveling before it struck. As the plunger travels through its working stroke, the piston closes off the escape apertures one by one, decelerating the load until at the last only a fraction of the original flow area remains, and plunger and load settle to a gentle stop with face 63 of valve 35 resting against the surface 168 of the plug member.

FIG. 8 shows that the present invention is particularly well qualified for use as an impact absorber. The sturdy construction of plunger 29 adapts it to receive harmless, any number of hammer-like blows from fast moving loads, not only because it has no joints or elements which can become loosened or misaligned, but also because it offers minimum inertial resistance to such loads and therefore produces very little impact when first struck.

An impact absorber will stop a load more gently if the deceleration is extended throughout the whole stroke of the unit than it will stop the same load if the deceleration is confined to only a portion of the stroke. For this reason, the adjustment means provided in the present invention provides an exceptional advantage because it furnishes a means of adjusting the unit to apply full stroke deceleration to a wide range of loads and at different speeds. It does this by providing means whereby the escape area of all apertures may be adjusted simultaneously to change the total escape area without changing the inter-relationship of the escape areas existing at different points in the stroke under various adjustment settings.

In the second species there are no valve balls provided. Instead, the primary escape groove 259 is spaced away from the escape apertures so that escaping fluid must pass around the obstruction provided by outer diameter 261 of the cylinder member as shown by the flow arrows in FIG. 10. Due to the eccentric surface 223 in the housing, the space at 263 acts as a restriction through which the fluid must flow, and the radial width of the said space varies as cylinder member 255 is rotated within the said housing. Therefore adjustment of the unit may be made as in the first species simply by rotation of adjustment plug member 137, which in turn rotates the said cylinder member to vary the said flow restriction.

*Filter System, Pressure Relief, and Plug Seal*

In the second species the configuration and operation of the filter system and the pressure relief system are the same as in the first species.

The plug seal 265 at the plug member differs by the omission of the low friction rings, these not being shown because they are not absolutely necessary for reasons explained under the first species.

*Mounting Bracket*

As an aid to increasing the versatility of the invention in regard to mountability, chordal notches 225 are provided on housing 221 as shown in FIGS. 8 and 11, and a special bracket 269 is provided as shown in FIG. 19. It will be seen that the said notches do not interfere with mounting the device within a plain hole as illustrated in FIGS. 17-18 but do make it possible to mount the device on a flat supporting base 271 as in FIG. 19 using the said bracket for this purpose.

Bracket 269 is shown to be simple in shape having a bore 273, two holes for mounting bolts 275, and an axially extending slot 277 which allows the bolts to clamp the bore tightly to the housing 221. Bore 273 is originally made a little larger than the outer diameter of the housing 221 to facilitate assembly of said housing therein, and the holes for mounting bolts 275 are located so said bolts fit snugly into the chordal notches 225 when assembled as shown in FIG. 19. As bolts 275 are tightened, they simultaneously clamp the bracket tightly to the housing 221 and to the flat supporting base 271. Housing 221 is thereby held so firmly that it cannot vibrate or move axially due to repeated blows on the plunger 29, nor rotate due to rotation of plug member 137 when it is adjusted.

*Third Species*

FIGS. 13-16 show a third species of the invention. It has a reservoir-seal structure and plug seal structure that are similar to those of the second species but which are adaptable for use under conditions of temperature or chemical environment which dictate that the flexible seals must be made of material which has poor elastic or permanent set properties. The third species also is shown with a more simplified adjustment means which may be used to advantage on any species of the invention when there is only one escape aperture. Parts which remain identical in structure with those of the second species are: bushing 27, plunger 29, filter elements 171 and 173 and resilient seal member 265.

*Housing*

In FIG. 13, numeral 321 indicates the housing member which is like that of the second species except that it has a larger expansion cavity 323, one less vent slot, and no eccentric bore.

*Reservoir-Seal Structure*

When a unit of the third species is assembled, diaphragm member 325 is expanded to the diameter shown in FIG. 13 by introduction of the working fluid under pressure in the same way as was described under the second species. If the flexible material is silicone rubber or some other material having poor elastic properties, the said diaphragm member will gradually relax in tension and allow the "at rest" reserve pressure to reach a lower than original value. It is usually possible to choose a material which will meet the requirements of the unit, yet retain at least a little tension after aging to maintain the plunger 29 in its no-load position. Such a material may, however, relax enough to lower the average reserve pressure to the point where the speed of return of the said plunger after a working stroke is too slow to be satisfactory. In the present species this possibility is obviated by making expansion chamber 323 airtight.

The operation of the airtight chamber may be understood from FIG. 13 in which the plunger 29 and diaphragm member 325 are shown in their no-load positions, dotted line 326 being used to show the maximum expanded shape of the said diaphragm. Expansion chamber 323 is made substantially airtight by the fit of the said diaphragm member within housing bore 247a and the preponderance of the reserve fluid pressure inside the diaphragm member over the air pressure within chamber 323. During a working stroke, air is compressed within chamber 323 as the said diaphragm member expands, and the reserve pressure is thereby built up sufficiently by the combination of the elasticity of the material and the air pressure in chamber 323, to return the plunger at a satisfactory speed after the said working stroke is completed.

The value to which the said reserve pressure builds up depends on several factors, namely: thickness of the material at wall 327, modulus of elasticity of the material, and the volume of chamber 323. These factors can be properly balanced after all the working requirements for the device are known.

*Plug Seal*

In the third species, spring means are provided to compensate for poor elastic properties in resilient seal member 265 to insure leakproofness of the same, and to insure permanent retention of retainer member 241 against diaphragm anchor portion 87. As shown in FIGS. 13 and 15, said means comprise a flat washer 329 and an elastic spring washer 331. Washer 331 is preferably made to have a free shape such as shown in FIG. 16, but it lies flat as shown in FIG. 13 after deformation of housing end 22. In trying to regain its shape of FIG. 16, spring washer 331 exerts continual axial thrust on flat washer 329 and cylinder member 355 and thereby maintains sealing compression in seal member 265, and axial contact pressure against retainer member 241. To serve its purpose, the spring means must be designed to have a low enough spring rate so that after the said seal member loses resilience because of age or wear, the said spring means will still maintain sealing compression therein. To satisfy this requirement, most sizes of the invention must be provided with a plurality of spring washers in tandem. Flat washer 329 may be omitted without impairing the original sealing action of the resilient seal member, but the said flat washer is necessary to distribute the spring pressure evenly to all points around the said seal member to insure a tight seal after the said seal member loses resilience or becomes worn. It will be apparent that by varying the number of spring washers, the friction at the adjustment plug member may be varied.

Operation and Adjustment

The adjustment means shown in FIG. 13 differs from that shown in FIG. 1 in that the adjustment plug member 333 rotates within the cylinder member 335 instead of rotating the said cylinder member within the housing. The third species adjustment means is therefore simpler than that of the second species because the key ball is eliminated between plug and cylinder and the eccentric surface in the housing is replaced by a more easily machined eccentric surface 337 on the said adjustment member.

The third species cylinder member 335 differs from the second in having only one escape aperture 257a and in having deeper notches 339 and 341 which serve as keyways as well as fluid flow passages. Rotation of cylinder member 335 within housing 321 is prevented by engagement of the said notches with projections 343 provided on the retainer member, the said retainer member being locked from rotating within housing 321 by taper 77 as described under the first species.

During a working stroke of plunger 29, fluid must flow past the obstruction provided by eccentric portion 337 of the adjustment plug member to enter escape aperture 257a as shown by the heavy flow arrow (FIG. 13), the speed of flow depending on the radial width of the space 345 (FIG. 14) which acts as a restriction to said flow. Adjustment of the speed of the plunger therefore may be made as in the first and second species, simply by rotation of adjustment plug member 333.

Filter System and Pressure Relief

In the third species, the operation of the filter system and the pressure relief system are the same as in the first and second species.

Installation of Fluid

At the time of assembly, the working fluid must first be installed, then pressurized to expand the diaphragm member and hold the plunger in its extended no-load position. It is a novel feature of the present invention to provide a convenient means of doing this by proportioning and arranging some of the elements of the device so that fluid may be introduced into the device by gravity flow, measured in quantity, and pressurized the proper amount all by manipulation of the said elements as they are assembled.

The installation of the fluid may be understood by referring to FIG. 15. To begin with, the plunger and reservoir-seal structure are installed in the housing. Next, the device is inverted from the position shown and the plunger is held retracted somewhat from its position of FIG. 15. Now valve 35 is held open and fluid is introduced into the housing by gravity flow. If a little air happens to be entrapped within the eye of the deflated diaphragm member at 349, it will not interfere appreciably with operation of the device. The plug member filter system is now filled with fluid to expel the air therefrom, then plug member 333 and cylinder member 335 are assembled together with plug seal member 265 and washers 329 and 331, and inserted into the housing slowly to force air out of the cylinder member through aperture 257a until the plug member has contacted valve 35. Insertion of plug and cylinder members now continues with the plunger being pushed along until the parts have almost reached their positions of FIG. 15. The plug and cylinder members then are held stationary while the plunger 29 is withdrawn slightly a pre-determined amount to pull a measured quantity of fluid into the device from the space surrounding seal member 265, then plug and cylinder members are pushed all the way into their positions of FIG. 15 where plug seal member 265 makes sealing contact with the shoulder 188 of the housing and traps the fluid therewithin.

Pressurization of the fluid is next accomplished as the plug and cylinder members move from their position of FIG. 15 to their final assembled positions of FIG. 13, exercising en route a piston effect which forces the diaphragm member 325 to expand to the shape shown in FIG. 13. Simultaneously the housing end 22, as in FIG. 1, may be deformed, the displaced metal entering groove 169 of the plug member as the parts settle in place. Convolution 89 will be found to have automatically located itself in the position of FIG. 13 after the plunger has made one or two strokes.

The foregoing pressure filling method may be used in substance for any species of the invention described previoulsy.

Fourth Species

FIGS. 20–26 show a fourth species of the invention which is shown constructed as a short stroke impact absorber. FIGS. 20 and 21 show that the device is made compact and simplified to the point of having no adjustment means, no separate plug seal and no filter system. It will be seen that a single diaphragm member performs all the sealing functions required by the device. Any one certain unit of this type would of course have a limited load and speed range, and would preferably be specially designed to make it suitable for mass applications, such as for example, on electric typewriters for the carriage stop.

Housing

In FIGS. 20 and 21, numeral 421 indicates the housing member which is similar to that of the second species except that internally it has no bushing for the plunger and no eccentric bore, and externally it has no mounting notches or chordal surfaces for wrenching purposes. The vent holes 423 and 424 are shaped differently but serve the same purpose as in the second species.

Plunger

Slidably mounted within bores 425 and 456 is plunger 429 which comprises piston rod member 431, piston member 433, check valve member 435, and valve spring 437. The said plunger is of simple construction and has large return ports, as described later, for the fluid so the check valve will open easily. The plunger is permitted to be of minimum length by the arrangement of having a tapered and grooved portion 439 of the piston provided to hold the anchor portion of the diaphragm member clamped to the piston rod and to act as a part of the alignment means between the piston and piston rod. Piston member 433 is provided with a tapered periphery 438 and a bore 441 to receive piston rod 431 with a press fit. A trepanned bore 443 provides adequate area for fluid return flow and provides a relatively thin wall at 445 so stretching of the material of said piston can take place as the press fitted piston rod enters. Two large oppositely disposed ports 447 are provided to intersect with the bore 443. Valve 435 is positioned by a loose fitting valve guide extension 449 provided on the piston and is held in place by curved spring washer 437 which in turn is retained by the deformed end of said valve guide at 451.

Cylinder Member

Cylinder member 453 is made with a closed end portion 455, tapered bore 456 to cooperate with piston periphery 438, pressure chamber 457, externally tapered and grooved portion 458, and a reduced diameter portion 459 which receives the deformed portion 22 of the housing.

Reservoir-Seal Structure

In principle of operation, the reservoir-seal structure is the same as that of the second species, however, it differs therefrom in construction of the first diaphragm anchor structure at the piston rod, which in this case is made similar to the anchor structure at the housing, this arrangement facilitating assembly and saving length of the plunger so the device can be kept to minimum size. The said seal structure comprises the double action flexible diaphragm member 463, taper 465 on the piston rod, tapered and grooved portions 439 and 458 on the piston and cylinder members, and bores 247a, 229a, 231a and 77a in the housing.

Operation

The operation of the device will be understood from FIG. 20 which shows the plunger traveling in the direction of arrow 466 at the beginning of a working stroke with the fluid escaping past the piston through passageway 461 formed by the clearance between piston periphery 438 and tapered bore 456; and from FIG. 21 which shows the plunger making a return stroke with the fluid returning from within the expanded diaphragm member past the open check valve 435 and back to within the pressure chamber. As the plunger travels through its working stroke, the taper of bore 456 causes the piston gradually to narrow the escape passageway 461, and decelerate the load until it comes to a gentle stop, with face 467 of the plunger resting against the surface 469 of the cylinder.

Mounting

This species of the invention may be mounted within a plain hole in a manner similar to that shown in FIG. 17, or it may be fastened to a surface 471 with a hat shaped bracket 473 as shown in FIG. 26.

Installation of Fluid and Assembly

FIG. 25 illustrates a method by which the fluid may be installed in this species, the housing not being shown. To begin with, the plunger 429 and diaphragm member 463 are assembled together as in FIG. 25, the said diaphragm member fitting snugly against the piston at 475 to make a temporary fluid seal. The plunger and diaphragm assembly is now inverted from the position shown in FIG. 25, and the valve 435 is opened against its spring and fluid allowed to flow within until it reaches the level of the said valve. Next, cylinder member 453 is separately filled with fluid. Now the plunger and diaphragm assembly is re-inverted and placed together with the cylinder member and allowed to settle slowly in place as excess fluid flows out of the cylinder member through the interstice at 460 to permit the parts to reach their positions of FIG. 25. Next, the diaphragm member is held snugly against the cylinder member at 477 while the lower end of said diaphragm member is folded back to a position such as shown by the dotted lines 481, and portion 458 of the cylinder member is cleaned to remove most of the fluid from the grooves. Next, the diaphragm member is returned to its former position and the housing is added and pushed in place far enough to compress the anchor portion of the diaphragm member lightly against said portion 458 of the cylinder member and trap the fluid within the device. Now the plunger 429 is depressed to position the convolution 89 and pressurize the fluid to create the reserve pressure therein as the housing is pushed into its final position of FIG. 20 and deformed at end 22 to hold it in place.

Miscellaneous—Fourth Species

In the fourth species, the same as in the others, foreign particles can accumulate in the fluid due to wear of the parts. However, the filter is omitted because of the configuration of the escape passageway 461, which in contrast to an aperture, cannot accumulate particles and become clogged because it is opened up and flushed clean at each return stroke of the plunger.

It will be apparent that whereas the fourth species is constructed to permit low fluid reserve pressure and high fluid working pressure as in the other species, there is no need to provide special passages for pressure relief at the seal points since isolation of the said seal points from high pressure is inherent in the device as constructed.

It should be understood that the present disclosure is for the purpose of illustration only, and that this invention includes all modifications and equivalents which come within the scope of the subject matter claimed.

What is claimed is:

1. A hydraulic control device comprising in combination: a tubular housing supporting internally a sealed variable volume enclosure containing a fluid, said enclosure containing a pressure chamber and reservoir space, a reciprocative plunger movable axially of said housing and having a first portion external of said enclosure and adapted to receive reciprocating actuating loads, said plunger having a second portion connected to the first portion and extending within the enclosure, said second portion extending through a part of the reservoir space to the pressure chamber to form a movable barrier between the pressure chamber and said part of the reservoir space to impede movement of the plunger, there being a passageway for fluid flow communicating between the pressure chamber and reservoir space to permit movement of the plunger; and a double action flexible annular diaphragm member having a first annular anchor portion attached to the plunger and a second annular anchor portion attached to the housing to form around the plunger a part of said enclosure, said diaphragm member having a first yieldable portion adjacent said first anchor portion which moves with the plunger in a direction toward the main body of contained fluid as the plunger moves inwardly of the enclosure, said diaphragm member having a second yieldable portion intermediate of said first yieldable portion and said second anchor portion, which moves in a direction away from the contained fluid to compensate for contraction of a portion of the enclosure by the plunger as said plunger moves inwardly of said enclosure, and means within the housing comprising an annular surface supporting and confining said first yieldable portion within a diameter smaller than the greatest diameter of said second yieldable portion to minimize movement of said second yieldable portion during a stroke of the plunger.

2. The subject matter of claim 1, and a cup-shaped cylinder member retained within the housing, said cylinder member having a closed end and a bore partially enclosing the said pressure chamber, said bore forming around said movable barrier said passageway, said bore being tapered to permit said movable barrier to vary the cross-sectional area of said passageway to decelerate the plunger as it travels through a stroke.

3. A hydraulic control device comprising in combination: an elongated housing, a sealed variable volume enclosure containing a fluid and located within the housing, said enclosure containing a pressure chamber and reservoir space and a first bore circumscribing said pressure chamber; a reciprocative plunger adapted to make inward and outward strokes axially of the housing and relative to the pressure chamber, said plunger having a first end portion external of said enclosure and adapted to receive actuating loads, there being a second bore encircling said first end portion of the plunger with clearance, said bores extending lengthwise of the housing, the plunger having a second end portion extending within the enclosure and arranged to move partly within said first bore to act as a movable barrier between said pressure chamber and a portion of said reservoir space, there being first and second passageways for fluid flow communicating between the pressure chamber and reservoir space, the first passageway having a restricted cross-sectional area to permit controlled movement of the plunger during an inward stroke, the second passageway being larger in cross-sectional area than the first passageway to permit fast outward strokes of the plunger, a spring operated check valve held across the second passageway to prevent flow therethrough from the pressure chamber to the reservoir during inward strokes of the plunger; double action flexible diaphragm means having anchor portions attached to the plunger and housing to form around the plunger a part of said enclosure, said diaphragm means having a first yieldable portion comprising an inner wall encircling a portion of said plunger and supported against the fluid thereby and an invaginable wall surrounding said inner wall and united therewith by a convolution to permit reciprocation of the plunger, said invaginable wall being supported against the fluid by said second bore, said diaphragm means being further provided with a second yieldable portion which expands resiliently to compensate for the added volume of the plunger as it enters farther within said convolution during an inward stroke, and means acting against said second yieldable portion and urging the latter against the fluid to provide a reserve pressure in the fluid to move the plunger outwardly of the enclosure with sufficient force to create a differential pressure between the pressure chamber and reservoir to open said check valve against the opposition of its spring to effect fast outward movement of the plunger.

4. A hydraulic control device comprising in combination: an elongated housing, a sealed enclosure containing fluid positioned in the housing, said enclosure containing a pressure chamber and reservoir space and a first bore partially enclosing the pressure chamber; a reciprocaitve plunger positioned to reciprocate in said housing to make inward and outward strokes relative to the pressure chamber, said plunger having a first end portion external of said enclosure and adapted to receive actuating loads, there being a second bore encircling said first end portion of the plunger with clearance, the plunger extending axially of said bores and having a second end portion contained within the enclosure and arranged to move partly within said first bore to act as a movable barrier between said pressure chamber and a portion of said reservoir space to impede movement of said plunger, there being a passageway for fluid communicating between the pressure chamber and reservoir space to permit movement of the plunger; double action flexible diaphragm means having portions attached to the plunger and housing to form around the plunger a part of said enclosure, said diaphragm means having a first yieldable portion comprising an inner wall encircling a portion of said plunger and supported against the fluid thereby and an invaginable wall surrounding said inner wall and united therewith by a convolution to permit reciprocation of the plunger, said invaginable wall being supported against the fluid by said second bore, said diaphragm means being further provided with a second yieldable portion which moves to compensate for deformation of the enclosure by the plunger as it enters farther within said convolution during an inward stroke; said plunger having a configuration including two diametrically opposed circumferentially arcuate wall portions connected by two flattened wall portions, said arcuate wall portions being axially extended to support a slidable part of said plunger engaged within said first bore, said slidable part having a substantially cylindrical bore therewithin, the external surfaces of said flattened wall portions intersecting with said cylindrical bore to form two ports in the plunger for fluid return flow; and check valve means attached to said plunger to control reverse fluid flow from said pressure chamber through said ports.

5. The device of claim 4, and said check valve means comprising a self aligning valve and tension spring, said valve having a seating face and a central stem protruding therefrom, said stem extending within said cylindrical bore and being provided with two tapered portions proximate at their large ends, said spring being supported by one end coil formed with two radially expanded portions extending outward through said ports in the piston, said spring having a helical body portion guided within said cylindrical bore, said helical body portion leading into a spiral terminating in a centrally disposed end coil adapted to be forced over the large ends of said tapered portions to retain said seating face against the end of said cylindrical bore.

6. A hydraulic control device comprising in combination: a tubular housing supporting internally a sealed variable volume enclosure containing a fluid, said enclosure containing a pressure chamber and reservoir space, a reciprocative plunger movable axially of said housing and having a first portion external of said enclosure and adapted to receive reciprocating actuating loads, said plunger having a second portion connected to the first portion and contained within the enclosure, said second portion extending through a part of the reservoir space to the pressure chamber to form a movable barrier between the pressure chamber and said part of the reservoir space, there being a passageway for fluid flow communicating between the pressure chamber and reservoir space to permit movement of the plunger; a double action flexible diaphragm member forming part of said enclosure, said diaphragm member encircling said plunger and being provided with: a first anchor portion attached to said plunger, an invaginated portion which folds within itself to encompass the said plunger to a varying degree as the same reciprocates, a yieldable portion which moves to permit expansive deformation of the enclosure to compensate for the contractive deformation of the enclosure by the plungers as it moves inwardly of said enclosure, and a substantially tubular second anchor portion; and means attaching said tubular second anchor portion to the housing comprising: a substantially smooth internal tapered wall surface within the housing, said second anchor portion being located within said tapered wall, a retainer member extending within said second anchor portion and secured from movement relative thereto, said retainer member being provided with an external tapered and grooved surface, a lateral annular shoulder provided on the retainer at the large end of said tapered surface, said lateral shoulder extending radially outward beyond the line of said tapered surface a distance less than the wall thickness of said second anchor portion, said lateral shoulder being adapted to abut the terminal edge of the second anchor portion as a locating means to retain the diaphragm member axially in position within the housing, said lateral shoulder further acting as a stop surface against said tapered wall to locate said retainer and to insure a predetermined mount of radial compression in said second anchor portion.

7. A hydraulic control device comprising in combination: a substantially cylindrical housing, a sealed variable volume enclosure in the housing containing fluid, said enclosure containing a pressure chamber and reservoir space and a bore forming a cylindrical wall of the pressure chamber; a reciprocative plunger adapted to make inward and outward strokes relative to the pressure chamber, said plunger having a first end portion external of said enclosure and adapted to receive actuating loads, the plunger having a second end portion connected to the first end portion and contained within the enclosure and arranged to move partly within said bore to act as a movable barrier between said pressure chamber and a portion of said reservoir space, there being a passageway for fluid flow communicating between the pressure chamber and reservoir space to permit movement of the plunger; a double action flexible diaphragm member forming yieldable boundaries for the enclosure, said diaphragm member surrounding the plunger and being provided in sequence with: a first annular anchor portion attached to the plunger, a first annular yieldable portion comprising two substantially cylindrical inner walls united by a convolution which permits reciprocation of the plunger by rolling to encompass the plunger to a varying degree as the same reciprocates, a second annular yieldable portion comprising a laterally extending pistion face portion and two substantially cylindrical outer walls united by a convolution adapted to roll within the housing, and a second annular anchor portion attached to said housing; a diaphragm support member axially movable between the said plunger and housing and arranged to support the said piston face portion of the diaphragm and the two walls of the diaphragm adjacent thereto against the fluid, and resilient means holding said support member against said piston face portion to create a reserve pressure in the fluid to prevent wrinkling of said diaphragm member and to urge return movement of the plunger after a working stroke, said resilient means permitting axial movement of said piston face portion and diaphragm support member to permit expansive deformation of the enclosure to compensate for the contractive deformation of the enclosure caused by the plunger as it moves through an inward stroke.

8. A hydraulic control device comprising: a single tubular housing, a reciprocative plunger operating axially of said housing through one end of said housing, a rotatable plug member closing the other end of said housing and rotatable about the axis of said housing, a double action annular diaphragm member having an annular anchor portion attached around said plunger and a diametrically larger annular anchor portion attached to the wall of said housing, said plug member and plunger and diaphragm member forming within said housing wall a sealed variable volume enclosure containing fluid, said enclosure containing a pressure chamber having a cylindrical wall parallel to the axis of said housing, there being a reservoir space within said enclosure surrounding a portion of said plunger, there being restricted passage means to permit controlled fluid flow between the pressure chamber and said reservoir space, said plunger forming a movable barrier between said chamber and reservoir space, said diaphragm member having a first yieldable portion adjacent the plunger which follows the plunger as the plunger moves inwardly of said enclosure, and a second yieldable portion intermediate of said first yieldable portion and said diametrically larger anchor portion which moves to permit expansive deformation of the enclosure to compensate for the contractive deformation of the enclosure caused by the plunger as it moves inwardly of said enclosure, and a valve structure in the housing adjacent the inner end portion of said plug to vary fluid flow permitted by said restricted passage means, adjustment of said valve structure being effected by rotationally adjusting said plug member.

9. The subject matter of claim 8, said plug member forming a closure for said pressure chamber; pressure relief means comprising a groove around said plug member, there being a passage affording communication between said groove and reservoir space; and a resilient seal member surrounding said plug and located outwardly beyond said groove, said groove intercepting fluid flow from said pressure chamber on its way to said seal member.

10. The subject matter of claim 8, said plug member forming an end wall for said pressure chamber, and said plug member having a circumferential shoulder engaged by a circumferentially swaged end portion of the housing whereby said plug is maintained in its operative position.

11. In a hydraulic control device having an elongated housing, a sealed variable volume enclosure therein containing a fluid, said enclosure containing a pressure chamber and reservoir space; a cylinder member having a wall and a bore encircling said pressure chamber; a reciprocative plunger positioned within said housing to make a working stroke when a load is applied to the plunger, said plunger having an end portion contained within the enclosure, a part of said end portion being movable within said bore, said cylinder member wall being provided with a flow aperture extending therethrough and communicating between the pressure chamber and reservoir space to permit flow of fluid from said chamber to said reservoir during a working stroke of the plunger; a double action flexible diaphragm member having a first anchor portion attached to the plunger and a second anchor portion attached to the housing to form around said plunger yieldable boundaries for the enclosure, said diaphragm member having a first yieldable portion adjacent the plunger and movable with the plunger to permit reciprocation thereof, and a second yieldable portion intermediate of said first yieldable portion and said second anchor portion which moves to permit expansive deformation of said enclosure to compensate for contractive deformation of the enclosure by the plunger as said plunger moves inwardly of the enclosure during a working stroke; means for variably restricting the flow through said aperture to control the speed of travel of the plunger, said means comprising, an eccentric surface provided adjacent said aperture to restrict flow therethrough, and an adjustment plug member extending within the housing and forming a closure for the end of said housing, said plug member being rotatable from within said housing to provide relative movement between said eccentric surface and said aperture to vary the proximity of the eccentric surface to said aperture to restrict fluid flow the desired amount; and fluid seal means provided between the plug member and housing to retain the contained fluid.

12. The subject matter of claim 11, and said eccentric surface extending circumferentially of said plug member, said plug member being rotatable relative to said cylinder member to modify the position of the eccentric surface in relation to said aperture.

13. The subject matter of claim 11, and said eccentric surface extending circumferentially of said housing, and means to key said rotatable plug member to the cylinder member to transmit rotation thereto to carry the aperture around the eccentric surface.

14. The structure recited in claim 13, and a valve ball and valve seat within a portion of said aperture, said eccentric surface contacting said ball to determine the proximity between ball and seat to restrict the flow through said aperture the desired amount.

15. A hydraulic control device comprising in combination: a tubular housing supporting internally a sealed variable volume enclosure containing a fluid, said enclosure containing a pressure chamber and reservoir space, a reciprocative plunger movable axially of said housing and having a first portion external of said enclosure and adapted to receive reciprocating actuating loads, said plunger having a second portion connected to the first portion and extending within the enclosure, said second portion extending through a part of the reservoir space to the pressure chamber to form a movable barrier between the pressure chamber and said part of the reservoir space to impede movement of the plunger, there being a passageway for fluid flow communicating between the pressure chamber and reservoir space to permit movement of the plunger; and a double action flexible annular diaphragm member having a first annular anchor portion attached to the plunger and a second annular anchor portion attached to the housing to form around the plunger a part of said enclosure, said diaphragm member having a first yieldable portion adjacent said first anchor portion which moves with the plunger in a direction toward the main body of contained fluid as the plunger moves inwardly of the enclosure, said diaphragm member having a second yieldable portion intermediate of said first yieldable portion and said second anchor portion, which moves in a direction away from the contained fluid to compensate for contraction of a portion of the enclosure by the plunger as said plunger moves inwardly of said enclosure, said yieldable portions being in contiguous contact with the fluid to retain the fluid and to insure return flow of the same to the pressure chamber when the plunger moves outwardly from the enclosure, and resilient means provided in said housing, said resilient means acting against said second yieldable portion and urging the latter against the fluid to provide a reserve pressure in the fluid to urge outward movement of the plunger in relation to the enclosure.

16. A hydraulic control device comprising in combination: an elongated housing supporting internally a sealed variable volume enclosure containing a fluid, said enclosure containing a pressure chamber and reservoir space, a reciprocative plunger movable axially of said housing and having a first portion external of said enclosure and adapted to receive reciprocating actuating loads, said plunger having a second portion connected to the first portion and extending within the enclosure, said second portion extending through a part of the reservoir space to the pressure chamber to form a movable barrier between the pressure chamber and said part of the reservoir space to impede movement of the plunger, there being a passageway for fluid flow communicating between the pressure chamber and reservoir space to permit movement of the plunger; double action flexible diaphragm means having a first anchor portion attached to the plunger and a second anchor portion attached to the housing to form a part of said enclosure, said diaphragm means having a first yieldable portion which moves with the plunger as the latter reciprocates, said diaphragm means having a second yieldable portion which moves to permit expansive deformation of the enclosure to compenate for the contractive deformation of the enclosure caused by the plunger as the plunger moves inwardly of the enclosure, and resilient means provided in said housing, said resilient means and said second yieldable portion being conjoined and acting in unison to accumulate potential energy in said resilient means and cause a resultant build-up of pressure in said fluid as said second yieldable portion moves to permit expansive deformation of the enclosure, said first yieldable portion being joined to said first anchor portion and extending therefrom to form an annular shape surrounding the plunger, said annular shape being concave to the fluid adjacent the plunger throughout the entire stroke of said plunger so that pressure existing in said fluid at any point in the plunger stroke induces tension in said first yieldable portion, causing the latter in turn to exert axial pull on said plunger urging outward movement of the latter in relation to the enclosure.

17. The device of claim 16 in which said second yieldable portion comprises an expansible wall having inherent elasticity which provides said resilient means.

18. The device of claim 16 in which an enclosed chamber containing air is provided within the housing surrounding said second yieldable portion, the air in said chamber providing said resilient means.

19. The device of claim 16, said housing having an end, and a bore in communication with said end, said plunger and diaphragm member and fluid being installed through said end; and means manipulatable during assembly of the device for pressurizing the fluid and closing said end of the housing, said means comprising a plug member secured within said bore, said plug member being installable through said bore incident to being secured therein, and fluid seal means encircling said plug member, said fluid seal means engaging a portion of said bore and being movable slidably therewithin during installation of said plug member for a sufficient distance to successively entrap, pressurize, and seal the fluid within the housing with pressure existing in the fluid.

20. A hydraulic control device comprising in combination: a tubular housing supporting internally a sealed variable volume enclosure containing a fluid, said enclosure containing a pressure chamber and reservoir space, a reciprocative plunger movable axially of said housing and having a first portion external of said enclosure and adapted to receive reciprocating actuating loads, said plunger having a second portion connected to the first portion and contained within the enclosure, said second portion extending through a part of the reservoir space to the pressure chamber to form a movable barrier between the pressure chamber and said part of the reservoir space, there being a passageway for fluid flow communicating between the pressure chamber and reservoir space to permit movement of the plunger; a double action flexible diaphragm member forming part of said enclosure, said diaphragm member encircling said plunger and being provided with: a first anchor portion attached to said plunger, an invaginated portion which folds within itself to encompass the said plunger to a varying degree as the same reciprocates, a yieldable portion which moves to permit expansive deformation of the enclosure to compensate for the contractive deformation of the enclosure by the plunger as it moves inwardly of said enclosure, and a substantially tubular second anchor portion; and means attaching said tubular second anchor portion to the housing comprising: an internal wall surface within the housing including a substantially smooth tapered wall portion, said second anchor portion being located within said tapered wall, a retainer member extending within said second anchor portion and secured from movement relative thereto, said retainer member being provided with an external tapered and grooved surface, a lateral annular shoulder provided on said retainer member adjacent the large end of said tapered surface, said lateral shoulder extending radially outward beyond the greatest diameter of said tapered surface, there being an external diameter of said retainer member adjacent said lateral shoulder contacting said internal wall surface to align said retainer member.

21. A hydraulic control device comprising in combination: an elongated housing supporting internally a sealed variable volume enclosure containing a fluid, said enclosure containing a pressure chamber and reservoir space, a reciprocative plunger movable axially of said housing and having a first portion external of said enclosure and adapted to receive reciprocating actuating loads, said plunger having a second portion connected to the first portion and extending within the enclosure, said second portion extending through a part of the reservoir space to the pressure chamber to form a movable barrier between the pressure chamber and said part of the reservoir space to impede movement of the plunger, there being a passageway for fluid flow communicating between the pressure chamber and reservoir space to permit movement of the plunger; and double action flexible diaphragm means having a first anchor portion attached to the plunger and a second anchor portion attached to the housing to form a part of said enclosure, said diaphragm means having a first yieldable portion adjacent said plunger which moves with the plunger, said diaphragm means having a second yieldable portion connected to said second anchor portion, said second yieldable portion being movable to permit expansion of a portion of the enclosure to compensate for contraction of a portion of the enclosure by the plunger as said plunger moves inwardly of said enclosure, a cylinder member having a wall and a first cylindrical bore encircling said pressure chamber, there being a second cylindrical bore within the enclosure encircling the wall of said cylinder member, a plug member retained within the housing engaging within said first and second cylindrical bores to form closures for both pressure chamber and reservoir space; pressure relief means comprising an annular space extending circumferentially of said plug member and forming a part of said reservoir space, there being communication between said annular space and the remainder of the reservoir space within the device, and fluid seal means surrounding said plug member, said annular space diverting fluid flow from the pressure chamber moving toward said fluid seal.

22. The subject matter of claim 21 and means constructed and arranged within said plug member to filter a portion of the fluid passing from said pressure chamber to said annular space.

23. In a hydraulic control device having an elongated housing, a sealed variable volume enclosure therein containing a fluid, said enclosure containing a pressure chamber and reservoir space; there being a bore encircling said pressure chamber; a reciprocative plunger positioned within said housing to make a working stroke when a load is applied to the plunger, said plunger having an end portion contained within the enclosure, a part of said end portion being movable within said bore, there being an aperture communicating between said pressure chamber and reservoir space to permit flow of fluid from said chamber to said reservoir during a working stroke of the plunger; double action flexible diaphragm means having a first anchor portion attached to the plunger and a second anchor portion attached to the housing to form around said plunger yieldable boundaries for the enclosure, said diaphragm means having a first yieldable portion adjacent the plunger and movable with the plunger to permit reciprocation thereof, and a second yieldable portion connected to said second anchor portion, said second yieldable portion being movable to permit expansion of a portion of said enclosure to compensate for contraction of a portion of the enclosure by the plunger as said plunger moves inwardly of the enclosure during a working stroke; means for variably restricting the flow through said aperture to control the speed of travel of the plunger, said means comprising, an eccentric surface provided adjacent said aperture to restrict flow therethrough, and adjustment means operable exteriorly of said housing to provide relative movement between said eccentric surface and said aperture to vary the proximity of said eccentric surface to said aperture to control the flow of fluid through said aperture.

24. In a hydraulic control device having an elongated housing, a sealed variable volume enclosure therein containing a fluid, said enclosure containing a pressure chamber and reservoir space; a cylinder member having a wall and a bore encircling said pressure chamber; a reciprocative plunger positioned within said housing to make a working stroke when a load is applied to the plunger, said plunger having an end portion contained within the enclosure, a part of said end portion being movable within said bore, said cylinder member wall being provided with a flow aperture extending therethrough and communicating between the pressure chamber and reservoir space to permit flow of fluid from said chamber to said reservoir during a working stroke of the plunger; double action flexible diaphragm means having a first anchor portion attached to the plunger and a second anchor portion attached to the housing to form a part of said enclosure, said diaphragm means having a first yieldable portion which moves with the plunger as the latter reciprocates, said diaphragm means having a second yieldable portion which moves to permit expansive deformation of the enclosure to compensate for the contractive deformation of the enclosure caused by the plunger as the plunger moves inwardly of the enclosure, means for variably restricting the flow through said aperture to control the speed of travel of the plunger, said means comprising, an eccentric surface extending circumferentially of said housing and located adjacent said aperture to restrict flow therethrough, and adjustment means accessible exteriorly of said device and operatively connected to said cylinder member for rotating the latter within the housing to provide relative movement between said eccentric surface and said aperture.

25. In a hydraulic control device for absorbing impact, the combination of: an elongated housing supporting internally a sealed variable volume enclosure containing fluid, said enclosure containing a pressure chamber and reservoir space, a cylinder member having a wall and a bore encircling said pressure chamber, a reciprocative plunger adapted to make a working stroke when a load is applied thereto, said plunger having an end portion including a slidable piston member contained within the enclosure, said piston member being slidable within said bore, said cylinder member wall being provided with a plurality of flow apertures extending therethrough and communicating between said pressure chamber and reservoir space to permit flow of fluid from said chamber to said reservoir space during a working stroke, said apertures being arranged lengthwise of said bore to permit the said piston member to close off the apertures progressively to decelerate the plunger as it travels through its working stroke; double action flexible diaphragm means attached to the plunger and housing to form around said plunger yieldable boundaries for the enclosure, said diaphragm means having a first yieldable portion movable with the plunger to permit reciprocation thereof, and a second yieldable portion which moves to permit expansion of a portion of said enclosure to compensate for the contraction of a portion of the enclosure by the plunger as said plunger moves inwardly of the enclosure during a working stroke; means for adjusting the rate of deceleration of the plunger by adjusting the fluid flow through a plurality of the said apertures simultaneously, said means comprising an eccentric surface provided within the housing and arranged around the cylinder member facing said apertures to restrict flow therethrough, and adjustment means operable exteriorly of said housing and operatively connected to said cylinder member to transmit rotation to the cylinder member to carry the apertures around said eccentric surface to a point where the proximity of said eccentric surface to said apertures restricts the flow the desired amount.

26. The device specified in claim 25 in which the external surface of the wall of said cylinder member is provided with a substantially longitudinally disposed fluid escape groove spaced circumferentially from said apertures, said groove facilitating the surge of fluid away from the apertures when the plunger is being actuated by high speed impact loads.

27. A hydraulic control device comprising in combination: an elongated housing, a sealed variable volume enclosure containing fluid and positioned internally in said housing, said enclosure containing a pressure chamber and reservoir space, a plunger having a first portion external of said enclosure and adapted to receive actuating loads, said plunger being reciprocative axially of said housing and having a second portion connected to the first portion and extending within the enclosure, said second portion extending through a part of the reservoir space to the pressure chamber to form a movable barrier between the pressure chamber and said part of the reservoir space to impede movement of the plunger during an inward stroke, said barrier having a terminal portion facing the pressure chamber, there being an area of the plunger at least equal to the entire cross-sectional area enclosed by the perimeter of said terminal portion exposed to fluid pressure within the enclosure acting in a direction opposite the movement of the plunger during an inward stroke, there being a passageway for fluid flow communicating between the pressure chamber and reservoir space to permit movement of the plunger; double action flexible diaphragm means having anchor portions attached to the plunger and housing to form around the plunger a part of said enclosure, said diaphragm means having a first yieldable portion comprising a cylindrical inner wall encircling a portion of said plunger and an invaginable wall surrounding said inner wall and united therewith by a convolution to permit reciprocation of the plunger, said diaphragm means being further provided with a second yieldable portion which moves to permit expansive deformation of the enclosure to compensate for the contractive deformation of the enclosure caused by the plunger as it enters farther within said convolution during an inward stroke, and means within the housing comprising an internal annular surface supporting said invaginable wall against the fluid and confining the periphery of the convolution within a diameter smaller than the greatest diameter of said second yieldable portion to minimize the movement required of the second yieldable portion, and resilient means provided to pressurize said fluid to hold said convolution in shape to insure smooth rolling action of the same, said resilient means being conjoined with said second yieldable portion and acting in unison with the latter to effect accumulation of potential energy in said resilient means and consequent build-up of pressure in said fluid as said second yieldable portion moves to permit expansive deformation of the enclosure.

28. A hydraulic control device comprising in combination: an elongated housing, a sealed variable volume enclosure containing fluid and positioned internally in said housing, said enclosure containing a pressure chamber and reservoir space, a plunger having a first portion external of said enclosure and adapted to receive actuating loads, said plunger being reciprocative axially of said housing and having a second portion connected to the first portion and extending within the enclosure, said second portion extending through a part of the reservoir space to the pressure chamber to form a movable barrier between the pressure chamber and said part of the reservoir space to impede movement of the plunger during an inward stroke, said barrier having a terminal portion facing the pressure chamber, there being an area of the plunger at least equal to the entire cross-sectional area enclosed by the perimeter of said terminal portion exposed to fluid pressure within the enclosure acting in a direction opposite the movement of the plunger during an inward stroke, there being a passageway for fluid flow communicating between the pressure chamber and reservoir space to permit movement of the plunger; double action flexible diaphragm means having anchor portions attached to the plunger and housing to form around the plunger a part of said enclosure, said diaphragm means having a first yieldable portion comprising a cylindrical inner wall encircling a portion of said plunger and an invaginable wall surrounding said inner wall and united therewith by a convolution to permit reciprocation of the plunger, said diaphragm means being further provided with a second yieldable portion which moves to permit expansive deformation of the enclosure to compensate for the contractive deformation of the enclosure caused by the plunger as it enters farther within said convolution during an inward stroke, and means within the housing comprising an internal annular surface supporting said invaginable wall against the fluid and confining the periphery of the convolution within a diameter smaller than the greatest diameter of said second yieldable portion to minimize the movement required of the second yieldable portion, and means anchoring said diaphragm member to said plunger, said means being sufficiently small in diameter to clear said invaginable wall for movement thereby as said plunger reciprocates, said means comprising: a reduced diameter portion provided on said plunger, a tubular anchor portion provided on said diaphragm member adjacent said inner wall having its terminal edge facing the fluid, and clamp means holding said anchor portion in a snug encircling fit around said reduced diameter portion, said clamp means comprising a plurality of constrictive coils arranged lengthwise of said plunger to provide a plurality of compression areas of contact between said anchor portion and said reduced diameter portion to inhibit axial extrusion of said anchor portion and insure a leakproof seal.

References Cited in the file of this patent

UNITED STATES PATENTS

| 1,205,106 | Oxnard | Nov. 14, 1916 |
| 2,145,891 | Rice | Feb. 7, 1939 |
| 2,639,913 | Reynolds | May 26, 1953 |
| 2,688,150 | Roussel | Sept. 7, 1954 |
| 2,816,670 | Edwards et al. | Dec. 17, 1957 |

FOREIGN PATENTS

| 4,201 | Great Britain | 1906 |
| 943,568 | Germany | May 24, 1956 |